United States Patent [19]

Aishima et al.

[11] 3,787,323
[45] Jan. 22, 1974

[54] PRODUCTION OF ETHYLENE POLYMERS AND ETHYLENE COPOLYMERS

[75] Inventors: Itsuho Aishima, Tokyo; Hisaya Sakurai, Yukichi Takashi, both of Kawasaki; Hideo Morita, Yoshiyuki Hirotsu, both of Yokohama; Tetsuo Hamada, Kawasaki, all of Japan

[73] Assignee: Asahi Kasei Kogyo Kabushiki Kaisha, Tokyo, Japan

[22] Filed: Nov. 17, 1971

[21] Appl. No.: 199,785

Related U.S. Application Data

[63] Continuation of Ser. No. 840,187, July 9, 1969, abandoned.

[30] Foreign Application Priority Data

July 16, 1968 Japan.................................. 43/49654

[52] U.S. Cl. .......... 260/88.2 F, 23/110, 252/429 R, 252/429 B, 260/88.2 R, 260/94.9 B, 260/94.9 C, 260/94.9 E
[51] Int. Cl......... C08f 1/44, C08f 3/06, C08f 15/04
[58] Field of Search .................. 260/94.9 B, 94.9 C, 260/94.9 E, 88.2 R, 88.2 F; 252/429 B

[56] References Cited
UNITED STATES PATENTS

| 3,661,878 | 5/1972 | Aishima et al.................. 260/94.9 C |
| 3,202,617 | 8/1965 | Enk et al........................ 260/94.9 E |

Primary Examiner—James A. Seidleck
Assistant Examiner—A. Holler
Attorney—Ralph D. Dinklage et al.

[57] ABSTRACT

The polymerization of ethylene and the copolymerization of ethylene with one alpha-olefin having three to 10 carbon atoms in the presence of a catalyst prepared by the reaction between (A) at least one compound of the general formula;

$R^1R^2HSiOAlX^1X^2$ wherein $R^1$ and $R^2$ represent independently members selected from the group consisting of alkyl groups having one to five carbon atoms, cyclohexyl, phenyl and 1-naphthyl; $X^1$ and $X^2$ represent members selected from the group consisting of alkyls having one to five carbon atoms, cycloalkyls having four to six carbon atoms, phenyl, p-tolyl and halogens selected from the group consisting of Cl, Br and I and at least one of $X^1$ and $X_2$ represents said halogen, and (B) at least one compound selected from the group consisting of 1. $TiX^3_p$, $VX^3_p$, $TiX^3_{4-q}(OR^3)_q$, $VOX^3_{3-r}(OR^3)_r$ and $VOX^3_3$ wherein $X^3$ represents halogen selected from the group consisting of Cl, Br, and I; $R^3$ represents one member selected from the group consisting of alkyls having one to six carbon atoms, cyclohexyl, phenyl and p-tolyl; $p$ is an integer of 2 to 4, $q$ is an integer of 1 to 3; $r$ is an integer of 1 to 2; and 2. the solid compounds obtained by the reaction between one member selected from the group consisting of $TiX^3_4$, $VX^3_4$, $TiX^3_{4-q}(OR^3)_q$, $VOX^3_{3-r}$ and $VOX^3_3$ and one member selected from the group consisting of $AlR^4_v(OR^5)_wX^3_{3-v}$, $SiR^6_3H$, $(R^7HSiO)_s$, $R^8R^9R^{10}SiO-(R^{11}HSiO)_t-SiR^{10}R^9R^8$ and a combination of one member selected from $SiR^6_3H$, $(R^7HSiO)_s$ and $R^8R^9R^{10}SiO-(R^{11}HSiO)_t-SiR^{10}R^9R^8$ and one member selected from $AlCl_3$, $AlBr_3$ and $FeCl_3$ wherein $R^3$ and $X^3$ represent independently the same groups as defined above; $R^4$ and $R^5$ represents independently the same groups above-defined $R^3$; $R^6$, $R^7$, $R^8$, $R^9$, $R^{10}$ and $R^{11}$ represent independently the same groups as above-defined $R^1$ or $R^2$; $q$ and $r$ represent independently the same integers as above-defined; $v$ is an integer of 1 to 3, $w$ is 0 or an integer of 1 to 2, $y$ is an integer of 1 to 3 and $v+w+y=3$; $s$ is an integer of 3 to 6; $t$ is at least one and the viscosity of $R^8R^9R^{10}SiO-(R^{11}HSiO)_t-SiR^{10}R^9R^8$ is at most 2,000 centistrokes, the mole ratio of the compound (A) to the compound (B) being 0.5 – 5 : 1.

7 Claims, 1 Drawing Figure

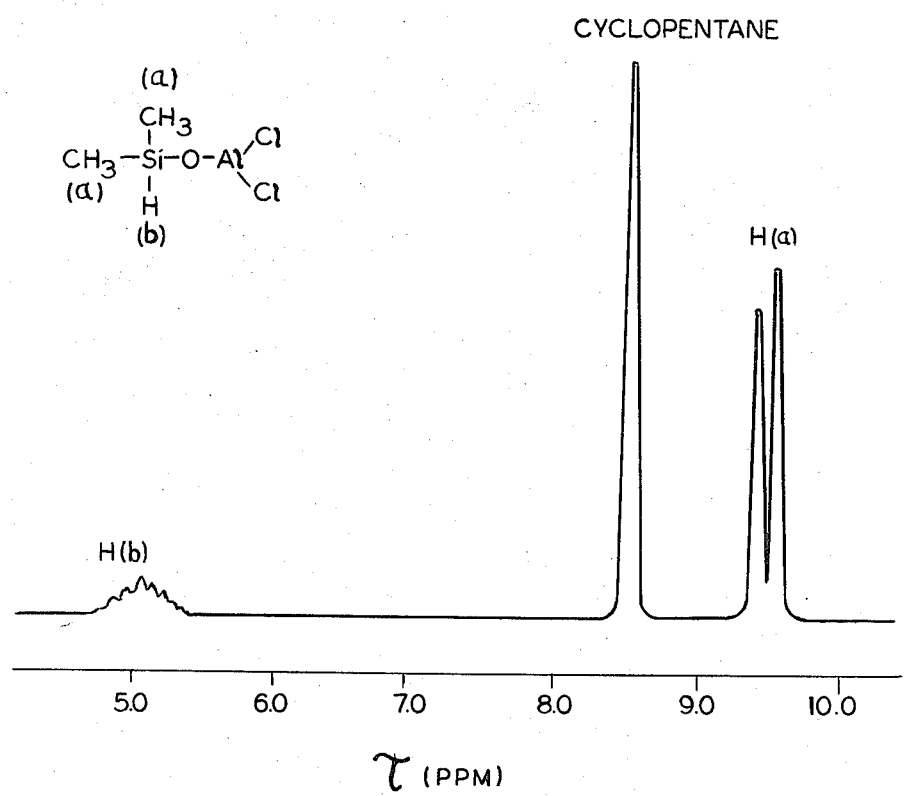

PRODUCTION OF ETHYLENE POLYMERS AND ETHYLENE COPOLYMERS

This application is a continuation of application Ser. No. 840,187, filed July 9, 1969, now abandoned.

This invention relates to the production of crystalline ethylene polymers and ethylene copolymers.

Heretofore, a variety of catalysts for polymerizing alpha-olefins have been proposed and each of the catalysts has its own characteristics.

For example, Japanese Pat. No. 282,694 describes a process for polymerizing ethylene, propylene or vinyl chloride using a catalyst prepared by treating a halide of transition metals such as $TiCl_4$, $TiCl_3$, $VCl_4$ and $CrCl_3$ or an alkoxide of transition metals with a silicon-containing compound having

group such as triethyl silane and methyl hydrogen silicone oil. In that process there is the formation of anomalous polymers and it is difficult to continuously operate the polymerization reaction. Further, the ethylene polymers according to that process have a low bulk density and a relatively high degree of branching and are not uniform in particle size.

It is an object of this invention to provide novel catalysts for the production of crystalline ethylene polymers and ethylene copolymers.

It is another object of this invention to provide a process for polymerizing ethylene or copolymerizing ethylene with one alpha-olefin having three to 10 carbon atoms by using said novel catalysts.

Other and additional objects of this invention will become apparent from a consideration of this entire specification including the claims hereof.

In accord with and fulfilling these objects, one aspect of this invention resides in a catalyst obtained by the reaction of (A) at least one compound containing silicon and aluminum represented by the formula;

$$R^1R^2HSiOAlX^1X^2$$

wherein $R^1$ and $R^2$ represent independently alkyls having one to five carbon atoms such as methyl, ethyl, normal propyl, isopropyl, normal butyl, isobutyl and normal pentyl, aryls such as phenyl and 1-naphthyl, and cycloalkyls such as cyclohexyl; $X^1$ and $X^2$ represent independently alkyls having one to five carbon atoms such as methyl, ethyl, normal propyl, isopropyl, normal butyl, isobutyl and normal pentyl, aryls such as phenyl and p-tolyl, cycloalkyls such as cyclobutyl, cyclopentyl and cyclohexyl and halogens such as $C_1$, Br, and I and at least one of $X^1$ and $X^2$ represents said halogen; and (B) at least one titanium or vanadium compound containing at least one halogen selected from;

1. $TiX^3_p$, $VX^3_p$, $TiX^3_{4-q}(OR^3)_q$, $VOX^3_{3-r}(OR^3)_r$ and $VOX^3_3$ wherein $X^3$ represents halogen such as Cl, Br, and I; $R^3$ represents alkyl having one to six carbon atoms such as methyl, ethyl, normal propyl, isopropyl, normal butyl, isobutyl, normal pentyl and normal hexyl, cycloalkyl such as cyclohexyl, and aryl such as phenyl and p-tolyl; p is an integer of 2 to 4, q is an integer of 1 to 3; r is an integer of 1 to 2; and 2. the said compounds obtained by the reaction of $TiX^3_4$, $VX^3_4$, $TiX^3_{4-q}(OR^3)_q$, $VOX^3_{3-r}(OR^3)_r$ or $VOX^3_3$ and $AlR^4_v(OR^5)_wX^3_{3-v}$, $SiR^6_3H$, $(R^7HSiO)_s$, $R^8R^9R^{10}SiO-(R^{11}HSiO)_t-SiR^{10}R^9R^8$ or a combination of one member selected from $SiR^6_3H$, $(R^7HSiO)_3$ and $R^8R^9R^{10}SiO-(R^{11}HSiO)_t-SiR^{10}R^9R^8$ and one member selected from $AlCl_3$, $AlBr_3$ and $FeCl_3$ wherein $R^3$ and $X^3$ represent independently the same groups as defined above; $R^4$ and $R^5$ represents independently the same groups above-defined $R^3$; $R^6$, $R^7$, $R^8$, $R^9$, $R^{10}$ and $R^{11}$ represent independently the same groups as above defined $R^1$ or $R^2$; q and r represent independently the same integers as above-defined; v is an integer of 1 to 3, w is 0 or an integer of 1 to 2, y is an integer of 1 to 3 and v+w+y=3, s is an integer of 3 to 6; t is at least one and the viscosity of $R^8R^9R^{10}SiO-(R^{11}HSiO)_t-SiR^{10}R^9R^8$ is at most 2,000 centistrokes, the mole ratio of (A) the compound containing silicon and aluminum to (B) the titanium or vanadium compound containing at least one halogen being 0.5 – 5 : 1.

It has now been found that by using such catalyst in the polymerization of ethylene, the polymers having a high bulk density may be produced and a series of the manufacturing steps such as polymerization, purification, separation, drying and pelletization may all be made small size and simplified. Additionally, the handling of such powdery polymers is easy since the particle size of polymers is relatively large and uniform and there is no danger of explosion due to fine powdery polymers and the melt-extruding step for pelletization is remarkably easy and accordingly a special device for feeding powdery polymers is not required. Further, a continuous operation of polymerization may be very easily effected since there is no formation of anomalous polymers such as the ones adhered to the wall of reactor or the bulky ones. Furthermore, only by selecting a combination of (A) the compound containing silicon and aluminum and (B) the titanium or vanadium compound containing at least one halogen even under the same polymerization conditions there may be easily produced a variety of polymers such as the ones having a high linearity for the production of containers and the ones having a comparatively high degree of branching to be used in an air molding.

Another aspect of this invention resides in the copolymerization of ethylene with one alpha-olefin having three to 10 carbons by using the catalyst above-mentioned.

According to this invention, examples of suitable compounds containing silicon and aluminum include $(CH_3)_2HSiOAlCl_2$, $(CH_3)_2HSiOAlBr_2$, $(CH_3)_2HSiOAlI_2$, $(C_2H_5)_2HSiOAlCl_2$, $(C_2H_5)_2HSiOAlBr_2$, $(C_2H_5)_2HSiOAlI_2$, $(n-C_3H_7)_2HSiOAlCl_2$, $(n-C_3H_7)_2HSiOAlBr_2$, $(n-C_3H_7)_2HSiOAlI_2$, $(i-C_3H_7)_2HSiOAlCl_2$, $(i-C_3H_7)_2HSiOAlBr_2$, $(i-C_3H_7)_2HSiOAlI_2$, $(n-C_4H_9)_2HSiOAlCl_2$, $(n-C_4H_9)_2HSiOAlBr_2$, $(n-C_4H_9)_2HSiOAlI_2$, $(i-C_4H_9)_2HSiOAlCl_2$, $(i-C_4H_9)_2HsiOAlBr_2$, $(i-C_4H_9)_2HSiOAlI_2$, $(n-C_5H_{11})_2HSiOAlCl_2$, $(n-C_5H_{11})_2HSiOAlBr_2$, $(n-C_5H_{11})_2HSiOAlI_2$, (cycle $C_6H_{11})_2HSiOAlCl_2$, (cyclo $C_6H_{11})_2HSiOAlBr_2$, (cyclo $C_6H_{11})_2HSiOAlI_2$, $(C_6H_5)_2HSiOAlCl_2$, $(1-C_{10}H_7)_2HSiOAlCl_2$, $(CH_3)(C_2H_5)HSiOAlCl_2$, $(CH_3)(n-C_3H_7)HSiOAlCl_2$, $(CH_3)(n-C_4H_9)HSiOAlCl_2$, $(CH_3)(n-C_4H_9)HSiOAlBr_2$, $(CH_3)(n-C_5H_{11})HSiOAlCl_2$, $(CH_3)(C_6H_5)HSiOAlI_2$, $(C_2H_5)(1-C_{10}H_7)HSiOAlCl_2$, $(CH_3)_2HSiOAlCl(CH_3)$, $(CH_3)_2HSiOAlBr(CH_3)$, $(CH_3)_2HSiOAlI(CH_3)$, $(C_2H_5)_2HSiOAlCl(C_2H_5)$, $(C_2H_5)_2HSiOAlBr(C_2H_5)$, $(C_2H_5)_2HSiOAlI(C_2H_5)$, $(C_2H_5)(n-C_3H_7)HSiOAlBr(n-C_3H_7)$, $(CH_3)(n-C_4H_9)HSiOAlBr(i-C_3H_7)$, $(n-C_4H_9)_2HSiOAlCl(n-C_4H_9)$, $(n-C_4H_9)_2HSiOAlI(n-C_4H_9)$, $(CH_3)(C_2H_5)HSiOAlCl(C_2H_5)$, $(CH_3)(i-C_3H_7)HSiOAlCl(C_2H_5)$, $(CH_3)(n-C_4H_9)HSiOAlCl(n-C_4H_9)$, $(CH_3)(n-C_5H_{11})HSiOAlCl(C_2H_5)$, $(CH_3)(C_6H_5)HSiOAlCl(C_6H_5)$, $(CH_3)(1-C_{10}H_7)HSiOAlCl(p-CH_3C_6H_4)$, $(CH_3)(cyclo\ C_6H_{11})HSiOAlCl(cyclo\ C_6H_{11})$, $(n-C_3H_7)_2HSiOAlCl\ (cyclo\ C_5H_9)$, $(C_2H_5)_2HSiOAlCl(cyclo\ C_4H_7)$ and $(CH_3)(i-C_4H_9)HSiOAlCl(i-C_4H_9)$.

These compounds are all stable novel compounds having a low vapor pressure and accordingly the present invention may be carried out safely.

These compounds are formed by the reaction:

1. between $R^1R^2HSiOSiHR^1R^2$ and $AlR^{12}X_2^3$ or $AlR^{12}R^{13}X^3$; and 2. between $(R^7HSiO)_s$ or $R^8R^9R^{10}SiO-(R^{11}HSiO)_t-SiR^{10}R^9R^8$ and $AlR^{12}X_2^3$ or $AlR^{12}R^{13}X^3$ wherein $R^1$, $R^2$, $R^7$, $R^8$, $R^9$, $R^{10}$, $R^{11}$ and $X^3$ represent independently the same groups as define afore; $R^{12}$ and $R^{13}$ represent independently alkyls having one to five carbon atoms, cycloalkyls such as cyclobutyl, cyclopentyl and cyclohexyl and aryls such as phenyl and p-tolyl; $X^3$ represents the same group as defined above.

These reactions may be effected in the presence or absence of a solvent such as a hydrocarbon at a temperature of room temperature to 210°C. in an inert atmosphere such as nitrogen.

The details of a process for preparing the compounds containing silicon and aluminum will be illustrated in the following.

According to the process (I), in a 500 ml. stainless steel vessel there are charged 26.8 g. of dimethyldihydrodisiloxane $[(CH_3)_2HSiOSiH(CH_3)_2]$ and 18.4 g. of $(CH_3)_2AlCl$ and the reaction vessel is closed and left to stand at 200°C. for 20 hours. After the reaction is completed, the vessel is cooled to room temperature and the content of the vessel is distilled to remove the distillate having a low boiling point and the remaining substance is distilled under reduced pressure to give 13.4 g. of the reaction product. This product has a boiling point of 57°C. at 2 mm. Hg. and is identified with $(CH_3)_2HSiOAlCl(CH_3)$ by the NMR spectrum analysis, the infra red absorption spectrum and the elementary analysis.

According to the process (2), in a 500 ml. glass reactor equipped with a stirrer there are charged 36.0 g. of $(CH_3)_2AlCl$, 23.4 g. of cyclic methylhydropolysiloxane $[(CH_3)HSiO]_4$ and 200 ml. of n-heptane and the reaction is carried out at 40°C. for 24 hours in a nitrogen atmosphere with stirring. The reaction product is distilled under reduced pressure to give 42 g. of the main distillate. This distillate has a boiling point of 56.5° to 57.0°C. at 2 mm. Hg. and is identified with $(CH_3)_2HSiOAlCl(CH_3)$ by the NMR spectrum analysis.

In the same manner, $(CH_3)_2HSiOAlCl_2$ is obtained by the reaction between $(CH_3)AlCl_2$ and $[(CH_3)HSiO]_4$. This reaction quantitatively proceeds at a temperature between 40° and 50°C. in accordance with the following equation;

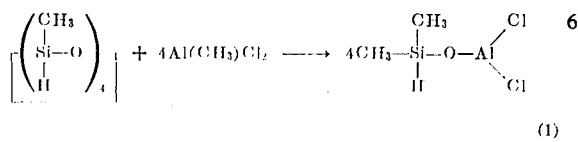

(1)

It is easily confirmed by the analysis of NMR spectrum of the reaction product what the structure of the reaction product is and whether the reaction have proceeded quantitatively. The NMR spectrum of thus obtained product is measured using a concentration of about 1 mole of the product per 1 l. of cyclopentane is shown in the accompanying FIGURE which exhibits the presence of bonds of two methyl groups and one hydrogen atom to silicon, the absence of bonds of methyl group to aluminum and the absence of the unreacted $[(CH_3)HSiO]_4$ and the free $(CH_3)AlCl_2$ in an unreacted state. Thus obtained compound of the formula;

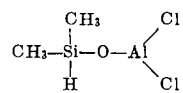

is soluble in hydrocarbon solvents and either the reaction solution as such may be employed as one component of the polymerization catalyst or the compound may be employed after being purified by distillation. The both exhibit the same behavior in the polymerization reaction. It is to be noticed as an interesting fact that this compound containing silicon and aluminum shown by the above-described formula does not have any aluminum-carbon bond and forms a catalyst having a high activity for polymerizing ethylene. Furthermore, the presence of the silicon-hydrogen bond shown in the above-described formula is an indispensable structural factor and the compound in which the silicon-hydrogen bond is substituted with a hydrocarbon group such as methyl represented by the formula;

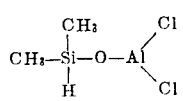

does not exhibit such a remarkable activity as the ones of this invention when employed in the present invention.

Examples of suitable titanium or vanadium compounds containing at least one halogen include $TiCl_4$, $TiCl_3$, $TiCl_2$, $VCl_4$, $VCl_3$, $VCl_2$, $TiBr_4$, $TiBr_3$, $TiBr_2$, $VBr_4$, $VBr_3$, $VBr_2$, $TiI_4$, $TiI_3$, $TiI_2$, $VI_4$, $VI_3$, $VI_2$, $TiCl_3(OCH_3)$, $TiCl_3(OC_2H_5)$, $TiCl_3(O\ n-C_4H_9)$, $TiCl_3(O\ n-C_6H_{13})$, $TiCl_3(O\ cyclo\ C_6H_{11})$, $TiCl_3(OC_6H_5)$, $TiCl_3(O\ p-CH_3C_6H_4)$, $TiBr_3(O\ CH_3)$, $TiBr_3(O\ C_2H_5)$, $TiBr_3(O\ n-C_2H_9)$, $TiI_3(O\ CH_3)$, $TiI_3(O\ C_2H_5)$, $TiI_3(O\ n-C_3H_7)$, $TiI_3(O\ i-C_3H_7)$, $TiI_3(O\ n-C_4H_9)$, $TiCl_2(O\ CH_3)_2$, $TiCl_2(O\ C_2H_5)_2$, $TiCl_2(O\ n-C_3H_7)_2$, $TiCl_2(O\ i-C_3H_7)_2$, $TiCl_2(O\ n-C_4H_9TiCl_2(O\ i-C_4H_9)_2$, $TiCl_2(O\ cyclo\ C_6H_{11})_2$, $TiCl_2(O\ p-CH_3C_6H_4)_2$, $TiI_2(O\ CH_3)_2$, $TiI_2(O\ C_2H_5)_2$, $TiI_2(O\ i-C_4H_9)_2$, $TiCl\ (O\ CH_3)_3$, $TiCl(O\ C_2H_5)_3$, $TiCl(O\ n-C_3H_7)_3$, $TiCl(O\ i-C_3H_7)_3$, $TiCl(O\ n-C_4H_9)_3$, $TiCl(O\ i-C_4H_9)_3$, $TiCl(O\ n-C_5H_{11})_3$, $TiCl(O\ C_6H_5)_3$, $TiI(O\ n-C_3H_7)_3$, $TiI(O\ i-C_3H_7)_3$, $VOCl\ _2(O\ CH_3)$, $VOCl_2(O\ C_2H_5)$, $VOCl_2(O\ n-C_3H_7)$, $VOCl_2(O\ i-C_3H_7)$, $VOBr_2(O\ n-C_3H_7)$, $VOBr_2(O\ i-C_3H_7)$, $VOBr_2(O\ n-C_4H_9)$, $VOBr_2(O\ i-C_4H_9)$, $VOI_2(OCH_3)$, $VOI_2(OC_2H_5)$, $VOI_2(On-C_5H_{11})$, $VOI_2(cyclo\ C_6H_{11})$, $VOI_2(O\ n-C_5H_{11})$, $VOCl(O\ CH_3)_2$, $VOCl(O\ C_2H_5)_2$, $VOCl(O\ n-C_3H_7)_2$, $VOCl(O\ i-C_3H_7)_2$, $VOBr(O\ CH_3)_2$, $VOBr(OC_2H_5)_2$, $VOBr(O\ i-C_4H_9)_2$, $VOI(O\ CH_3)_2$, $VOI(O\ C_2H_5)_2$, $VOCl_3$, $VOBr_3$ and $VOI_3$ and the solid compounds obtained by the reaction between one member selected from $TiCl_4$, $TiCl_2(O\ n-C_4H_9)_2$, $VCl_4$ and $VOCl_3$ and one member selected from $Al(C_2H_5)_3$, $Al(C_2H_5)_2$, $AlCl_2(C_2H_5)$, $Al(O\ C_2H_5)(C_2H_5)_2$, $Al(i-$ -C$_4$H$_9$)$_3$, AlCl(i-C$_4$H$_9$)$_2$, (CH$_3$)$_3$SiH, (C$_2$H$_5$)$_3$SiH, [(CH$_3$)HSiO]$_4$, (CH$_3$)$_3$SiO-[(CH$_3$)HSiO]$_{30}$-Si(CH$_3$)$_3$ and a combination of one member selected from (CH$_3$)$_3$SiH, (C$_2$H$_5$)$_3$SiH, [(CH$_3$)HSiO]$_4$ and (CH$_3$)$_3$SiO-[(CH$_3$)HSiO]$_{30}$-Si(CH$_3$)$_3$ and one member selected from AlCl$_3$, AlBr$_3$ and FeCl$_3$.

The reaction of these two catalyst components may be effected at a temperature of −70° to 100°C. in an inert reaction medium including aliphatic hydrocarbons such as n-hexane and n-heptane; aromatic hydrocarbons such as benzene, toluene and xylene; and alicyclic hydrocarbons such as cyclohexane and methyl cyclohexane. It is possible to add the two components of catalyst in the polymerization system and to react the two components of catalyst under the polymerization conditions in the course of polymerization reaction or to react the components of catalyst prior to the polymerization reaction. The mole ratio of the titanium or vanadium compound to the compound containing silicon and aluminum is preferably in the range of 1:0.5 − 5.0, and more preferably in the range of 1:0.5 − 2.0 to obtain a catalyst having a high activity.

The alpha-olefins having three to 10 carbon atoms which are copolymerizable with ethylene, include propylene, butene-1, 3-methylbutene-1, pentene-1, 4-methylpentene-1, hexene-1, heptene-1, octene-1, nonene-1 and decene-1.

According to the present invention, the ethylene copolymers contain at most 10 weight percent of the alpha-olefin.

In the production of the polymers and copolymers, polymerization may be conducted with or without a reaction medium, and the preferable, reaction medium is an aliphatic, alicyclic or aromatic hydrocarbon inert to each of the catalyst components, such as, for example, butane, n-hexane, isooctane, benzene, toluene, xylene, tetrahydronaphthalene, cyclohexane, methylcyclohexane and the like.

The ratio of such a solvent to ethylene or together with the alpha-olefin may arbitrarily be determined according to the mode of polymerization. Ordinarily, however, it is preferable to employ less than 100 parts by weight of the solvent per part by weight of ethylene or together with the alpha-olefin.

The catalyst is charged in a reactor together with a reaction medium and, for example, ethylene is induced thereto at a pressure of 1 to 20 Kg./cm$^2$. in an inert atmosphere. The polymerization is effected at a temperature of room temperature to 150°C. In order to control a molecular weight of, hydrogen gas, a halogenated hydrocarbon such as carbon tetrachloride and carbon tetraiodide or an organo-metallic compounds capable of easily causing the chain transfer reaction such as diethyl zinc may be introduced or added to the reaction system. It is preferred to introduce hydrogen gas in proportion of at most 50 mole percent based upon the ethylene reactant or together with the alpha-olefin reactant.

This invention will be illustrated by the following examples which are in no way limiting upon the scope thereof. Viscosities are intrinsic viscosities measured using a concentration of 0.1 gram of the polymer per 100 cc. of tetralin at 135°C.

EXAMPLE 1

The first catalyst component of (CH$_3$)$_2$HSiOAlCl$_2$ was prepared as follows. In a 500 ml. glass reactor equipped with a stirrer 36.0 g. of (CH$_3$)AlCl$_2$, 19.0 g. of [(CH$_3$)HSiO]$_4$ and 220 ml. of cyclopentane were charged and reacted at 40°C. for 24 hours under a nitrogen atmosphere with stirring. The reaction product was colorless transparent liquid. The reaction proceeded quantitatively according to the equation (1). The reaction product shown in the above-described equation was a nearly pure compound and the unreacted reagents were not found from a NMR analysis of the reaction product. Accordingly, the reaction solution as such was used in the polymerization.

0.72 g. of TiCl$_4$, 1.4 g. of (CH$_3$)$_2$HSiOAlCl$_2$ and 20 ml. of n-heptane were charged in a 50 ml. flask and stirred in a nitrogen atmosphere at room temperature for 30 minutes to prepare a catalyst. Thus obtained catalyst was charged in a 2.0 l. autoclave which had been vacuumed and 1 l. of degassed and dehydrated n-heptane was added thereto. The autoclave was heated and ethylene was introduced thereto for 2 hours with stirring while maintaining the inner temperature of the autoclave at 80°C. and the inner pressure at 5 Kg./cm$^2$. After the polymerization was completed, isopropyl alcohol was added to decompose the catalyst and the polymers were filtered off and dried. There were obtained 321 g. of white powdery polymers having an intrinsic viscosity of 5.7 and a bulk density of 0.41. The distribution of the particle size of polymers was narrow and the polymers having a particle size of 0.15 to 0.2 mm. were 68 percent by weight and the formation of ribbon- or bulk-shaped polymers was not observed.

EXAMPLE 2

A compound containing silicon and aluminum represented by the formula; (CH$_3$)$_2$HSiOAl(CH$_3$)Cl was prepared in the same manner as in Example 1, except that 29.8 g. of (CH$_3$)$_2$AlCl were used instead of (CH$_3$)AlCl$_2$. 6.0 g. of TiCl$_4$ and 9.4 g. of (CH$_3$)$_2$HSiOAl(CH$_3$)Cl were reacted in 160 ml. of the paraffin hydrocarbons having a point of 100° to 140°C. under a nitrogen atmosphere at room temperature for 1 hour. Then the resulting reaction mixture was charged in a 15 l. glass-lined autoclave with a stirrer and 8 l. of the sufficiently dehydrated paraffins. A hydrogen-ethylene mixture containing 0.30 percent of hydrogen was introduced thereto for 3.5 hours with stirring while maintaining the inner temperature of the autoclave at 30°C. and the inner pressure at 5 Kg./cm$^2$. After the polymerization was completed, methyl alcohol was added to decompose the catalyst and the polymers were filtered off and dried. There were obtained 3.3 Kg. of white powdery polymers having an intrinsic viscosity of 1.43, an true density of 0.956 and a bulk density of 0.40. Neither adhesion of the polymers to the autoclave nor the formation of ribbon- or bulk-shaped polymers was observed. The distribution of the particle size of polymers was narrow and the polymers having a particle size of 0.15 to 0.2 mm. were 74 percent by weight. Furthermore, the melt-extrusion of thus obtained polymers by a pelletizer was operated efficiently and smoothly to give white pellets.

EXAMPLE 3

In the same manner as in Example 1 except that 1.1 g. of TiCl$_2$ (O$_n$-C$_4$H$_9$)$_2$ instead of TiCl$_4$ were employed, the polymerization was carried out and 396 g. of white powdery polymers having an intrinsic viscosity of 6.4 and a bulk density of 0.41.

EXAMPLE 4

In the same manner as in Example 1, except that instead of ethylene a hydrogen-ethylene mixture containing 0.25 percent of hydrogen was employed, the polymerization was carried out and 324 g. of white powdery polymers of uniform size having an intrinsic viscosity of 1.20, a true density of 0.963 and a bulk density of 0.39.

EXAMPLE 5

The catalyst was prepared as follows. 6.7 g. of $AlCl_3$, 22 ml. of methylhydropolysiloxane having a viscosity of 100 centistrokes at 30°C. which terminals had been blocked with trimethylsilyl group and 13.4 ml. of $TiCl_4$ were added to 200 ml. of ligroin having a boiling point of 70°C. to 80°C. and the reaction was carried out at 85°C. for 2 hours to give a reaction solution containing brown precipitates. These precipitates were filtered off using glass fibers, washed with 200 ml. of ligroin, transferred to an Asahina-type extractor for a continuous operation, extracted and washed with n-heptane over 72 hours. After removing off the solvent under vacuum there were obtained 10.6 g. of solid product. The analytical results of thus obtained solid substance is shown in Table I.

TABLE I

| Element | Ti $Ti^{3+}$ | Ti $Ti^{4+}$ | Si | Al | Cl | C | H |
|---|---|---|---|---|---|---|---|
| Observed value (percent by weight) | 22.7 | 2.5 | 6.5 | 0.4 | 55.5 | 5.3 | 1.1 |
| Atomic ratio | 0.91 | 0.09 | 0.44 | 0.03 | 2.96 | 2.02 | 6.17 |

Thus obtained brown solid product consists of complicated compounds or complexes containing titanium, silicon, aluminum, oxygen, chlorine, carbon and hydrogen. The compound containing silicon and aluminum represented by $(CH_3)_2HSiOAlCl_2$ was prepared in the same manner as in Example 1.

1.2 g. of the above-mentioned solid product and 3.4 g. of $(CH_3)_2SiOAlCl_2$ were charged in a 1.7 l. autoclave with a stirrer and the autoclave was vacuumed. 800 ml. of ligroin were inhaled in the autoclave and ethylene was introduced thereto for 2 hours with stirring while maintaining the inner temperature of the autoclave at 85°C. and the inner pressure at 3 Kg./cm². After the polymerization was completed, isopropyl alcohol was added to decompose the catalyst. There were obtained 270 g. of white powdery polymers having an intrinsic viscosity of 2.61, a true density of 0.951 and a bulk density of 0.41. The distribution of the particle size of polymers was very narrow and the polymers having a particle size of 0.15 to 0.2 mm. were 65 percent by weight and the formation of ribbon- or bulk-shaped polymers was not observed.

EXAMPLE 6

30 g. of the compound containing silicon and aluminum represented by $(CH_3)(C_2H_5)HSiOAl(C_2H_5)Cl$ prepared in the same manner as in Example 2 except that 38.8 g. of $(C_2H_5)_2AlCl$ was used, and 19 g. of $TiCl_4$ were added to 200 ml. of ligroin and the reaction was carried out at room temperature for 2 hours to obtain a reaction solution containing brown precipitates. The reaction products were filtered off in an inert atmosphere and the solid substance was washed with 400 ml. of ligroin and after removing off the solvent under vacuum, 16 g. of solid substance was obtained.

1.0 g. of the above-mentioned solid substance and 4.0 g. of $(CH_3)(C_2H_5)HSiOAl(C_2H_5)Cl$ were charged in a 1.7 l. autoclave with a stirrer and the autoclave was vacuumed. 800 ml. of ligroin were inhaled in the autoclave and ethylene was introduced thereto for 2 hours with stirring while maintaining the inner pressure at 3 Kg./cm². and a temperature at 85°C. After the polymerization was completed, methyl alcohol was added to decompose the catalyst and there were obtained 307 g. of white powdery polymers of uniform particle size having an intrinsic viscosity of 3.94 and a bulk density of 0.37.

EXAMPLE 7

In the same manner as in Example 1, except that 1.0 g. of beta-$TiCl_3$ was used instead of $TiCl_4$ the polymerization was carried out and 321 g. of white powdery polymers of uniform particle size having an intrinsic viscosity of 2.17 and a bulk density of 0.41.

EXAMPLE 8

In the same way as in Example 1, except that instead of $TiCl_4$, 0.73 g. of $VCl_4$ was used, the polymerization was carried out and 307 g. of white powdery polymers of uniform particle size having an intrinsic viscosity of 0.47 and a bulk density of 0.37.

EXAMPLE 9

In the same way as in Example 1, except that 39 g. of $[(C_6H_5)HSiO]_3$ prepared in the same process as described in J. Am. Chem. Soc., 79, 1437 (1957) were used instead of $[(CH_3)HSiO]_4$, the polymerization was carried out and 341 g. of white powdery polymers of uniform particle size having an intrinsic viscosity of 3.9 and a bulk density of 0.39.

EXAMPLES 10 TO 18

A mixture of n-heptane and a comonomer set forth in Table II was prepared by mixing 1 l. of degassed n-heptane with 10 g. of the comonomer in the following manner. Gaseous propylene, butene-1 and 3-methylbutene-1 from a bomb were independently condensed in an autoclave cooled with dry ice. The other comonomers were independently weighed in a pressure ampoule at room temperature. 10 g. of thus obtained comonomer and 1 l. of n-heptane were placed in an autoclave which had been vacuumed, and the autoclave was shaken to produce a mixture of n-heptane and the comonomer.

In the same manner as in Example 1, the catalyst was introduced in an autoclave and the above-mentioned mixture of n-heptane and the comonomer instead of 1 l. of heptane was added thereto. Then the polymerization was carried out in the same manner as in Example 1 and the formation of ribbon- or bulk-shaped polymers was not observed. The results are shown in Table II.

TABLE II

| Example No. | Comonomer | Polymer Yield (gram) | Content of Comonomer* (% by weight) | Bulk Density | Intrinsic Viscosity |
|---|---|---|---|---|---|
| No. 10 | | | | | |

| | | | | | |
|---|---|---|---|---|---|
| 11 | Propylene | 341 | 2.5 | 0.39 | 2.3 |
| 12 | Butene-1 | 325 | 1.4 | 0.40 | 2.6 |
| 13 | 3-Methylbutene-1 | 291 | 1.6 | 0.37 | 2.2 |
| 14 | Pentene-1 | 297 | 1.2 | 0.39 | 1.9 |
| 15 | 4-Methylpentene-1 | 276 | 1.0 | 0.38 | 2.8 |
| 16 | Hexane-1 | 268 | 0.8 | 0.36 | 3.1 |
| 17 | Heptene-1 | 241 | 0.7 | 0.37 | 3.2 |
| 18 | Octene-1 | 253 | 0.7 | 0.36 | 2.7 |
| | Decene-1 | 261 | 0.5 | 0.35 | 2.9 |

\* The content of a comonomer was calculated from the absorption at 1,378 cm$^{-1}$ of the infra red absorption spectrum.

EXAMPLES 19 to 29

The polymerization of ethylene was carried out in the same way as in Example 4 except that 4 mmoles of a variety of titanium or vanadium compounds and 8 mmoles of a variety of compounds containing silicon and aluminum set forth in Table III were employed. The results are shown in Table III. All polymers thus obtained had a uniform particle size.

TABLE III

| Example No. | Titanium or vanadium compound | $R^1R^2HSiOAlX^1X^2$ | | | | Polymer yield (gram) | Intrinsic viscosity | Bulk density |
|---|---|---|---|---|---|---|---|---|
| | | $R^1$ | $R^2$ | $X^1$ | $X^2$ | | | |
| 19 | $TiCl(OCH_3)_3$ | $C_2H_5$ | $n-C_3H_7$ | Br | $n-C_3H_7$ | 362 | 1.73 | 0.41 |
| 20 | $TiBr_3(OC_2H_5)$ | $CH_3$ | $n-C_4H_9$ | Br | $i-C_3H_7$ | 305 | 1.92 | 0.38 |
| 21 | $TiI_3(Oi-C_3H_7)$ | $n-C_4H_9$ | $n-C_4H_9$ | I | $n-C_4H_9$ | 273 | 2.54 | 0.37 |
| 22 | $VOCl(On-C_3H_7)_2$ | $CH_3$ | $i-C_3H_7$ | Cl | $i-C_4H_9$ | 351 | 1.10 | 0.39 |
| 23 | $VOBr_2(Oi-C_4H_9)$ | $C_2H_5$ | $i-C_4H_9$ | Cl | $C_2H_5$ | 270 | 0.97 | 0.41 |
| 24 | $VOI (On-C_5H_{11})$ | $CH_3$ | $n-C_5H_{11}$ | Cl | $C_2H_5$ | 283 | 1.53 | 0.40 |
| 25 | $VOCl_2(Oi-C_6H_{11})$ | $CH_3$ | $C_6H_5$ | Cl | $C_6H_5$ | 251 | 1.27 | 0.36 |
| 26 | $TiCl_3(On-C_6H_{13})$ | $CH_3$ | $1-C_{10}H_7$ | Cl | $p-CH_3C_6H_4$ | 298 | 2.73 | 0.39 |
| 27 | $TiCl_3(O\ cyclo\ C_6H_{11})$ | $CH_3$ | Cyclo $C_6H_{11}$ | Cl | Cyclo $C_6H_{11}$ | 264 | 1.82 | 0.38 |
| 28 | $TiCl_3(O\ C_6H_5)$ | $n-C_3H_7$ | $n-C_3H_7$ | Cl | Cyclo $C_5H_9$ | 208 | 2.26 | 0.40 |
| 29 | $TiCl_3(O-p-CH_3C_6H_4)$ | $C_2H_5$ | $C_2H_5$ | Cl | Cyclo $C_4H_7$ | 241 | 2.01 | 0.39 |

What is claimed is:

1. A process for producing an ethylene polymer which comprises polymerizing ethylene in the presence of a catalyst prepared by the reaction between (A) at least one compound of the general formula;

$$R^1R^2HSiOAlX^1X^2$$

wherein $R^1$ and $R^2$ represent independently members selected from the group consisting of alkyl groups having one to five carbon atoms, cyclohexyl, phenyl and 1-naphthyl; $X^1$ and $X^2$ represent members selected from the group consisting of alkyls having one to five carbon atoms, cycloalkyls having four to six carbon atoms, phenyl, p-tolyl and halogens selected from the group consisting of Cl, Br and I and at least one of $X^1$ and $X^2$ represents said halogen, and (B) at least one compound selected from the group consisting of 1. $TiX^3_p$, $VX^3_p$, $TiX^3_{4-q}(OR^3)_q$, $VOX^3_{3-r}(OR^3)_r$ and $VOX^3_3$ wherein $X^3$ represents halogen selected from the group consisting of Cl, Br, and I; $R^3$ represents one member selected from the group consisting of alkyls having one to six carbon atoms, cyclohexyl, phenyl and p-tolyl; $p$ is an integer of 2 to 4, $q$ is an integer of 1 to 3; $r$ is an integer of 1 to 2; and 2. the solid compounds obtained by the reaction between one member selected from the group consisting of $TiX^3_4$, $VX^3_4$, $TiX^3_{4-q}(OR^3)_q$, $VOX^3_{3-r}(OR^3)_r$ and $VOX^3_3$ and one member selected from the group consisting of $AlR^4_v(OR^5)_wX^3_{3-v}$, $SiR^6_3H$, $(R^7HSiO)_s$, $R^8R^9R^{10}SiO-(R^{11}HSiO)_r-SiR^{10}R^9R^8$ and a combination of the member selected from $SiR^6_3H$, $(R^7HSiO)_s$ and $R^8R^9R^{10}SiO-(R^{11}HSiO)_r-SiR^{10}R^9R^8$ and one member selected from $AlCl_3$, $AlBr_3$ and $FeCl_3$ wherein $R^3$ and $X^3$ represent independently the same groups above; defined above $R^4$ and $R^5$ represents independently the same groups above-defined $R^3$; $R^6$, $R^7$, $R^8$, $R^9$, $R^{10}$ and $R^{11}$ represent independently the same groups as above defined $R^1$ or $R^2$; $q$ and $r$ represent independently the same integers as above-defined; $v$ is an integer of 1 to 3, $w$ is 0 or an integer of 1 to 2, $y$ is an integer of 1 to 3 and $v + w + y = 3$; $s$ is an integer of 3 to 6; $t$ is at least one and the viscosity of $R^8R^9R^{10}SiO-(R^{11}HSiO)_r-SiR^{10}R^9R^8$ is at most 2,000 centistrokes, the mole ratio of the compound (A) to the compound (B) being 0.5 – 5:1.

2. A process according to claim 1, wherein the compound of the general formula;

$$R^1R^2HSiOAlX^1X^2$$

is selected from the group consisting of $(CH_3)_2HSiOAlCl$, $(CH_3)_2HSiOAlBr_2$, $(CH_3)_2HSiOAlI_2$, $(C_2H_5)_2HSiOAlCl_2$, $(C_2H_5)_2HSiOAlBr_2$, $(C_2H_5)_2HSiOAlI_2$, $(n-C_3H_7)_2HSiOAlCl_2$, $(n-C_3H_7)_2HSiOAlBr$, $(n-C_3H_7)_2HSiOAlI$, $(i-C_3H_7)_2HSiOAlCl_2$, $(i-C_3H_7)_2HSiOAlBr_2$, $(i-C_3H_7)_2HSiOAlI_2$, $(n-C_4H_9)_2HSiOAlCl_2$, $(n-C_4H_9)_2HSiOAlBr_2$, $(n-C_4H_9)_2HSiOAlI_2$, $(i-C_4H_9)_2HSiOAlCl_2$, $(i-C_4H_9)_2HSiOAlBr_2$, $(i-C_4H_9)_2HSiOAlI_2$, $(n-C_5H_{11})_2HSiOAlCl_2$, $(n-C_5H_{11})_2HSiOAlBr$, $(n-C_5H_{11})_2HSiOAlI_2$, $(cyclo\ C_6H_{11})_2HSiOAlCl_2$, $(cyclo\ C_6H_{11})_2HSiOAlBr_2$, $(cyclo\ C_6H_{11})_2HSiOAlI_2$, $(C_6H_5)_2HSiOAlCl_2$, $(1-C_{10}H_7)_2HSiOAlCl_2$, $(CH_3)(C_2H_5)HSiOAlCl_2$, $(CH_3)(n-C_3H_7)HSiOAlCl_2$, $(CH_3)(n-C_4H_9)HSiOAlCl_2$, $(CH_3)(n-C_4H_9)HSiOAlBr_2$, $(CH_3)(n-C_5H_{11})HSiOAlCl_2$, $(CH_3)(C_6H_5)HSiOAlI_2$, $(C_2H_5)(1-C_{10}H_7)HSiOAlCl_2$, $(CH_3)_2HSiOAlCl(CH_3)$, $(CH_3)_2HSiOAlBr(CH_3)$, $(CH_3)_2HSiOAlI(CH_3)$, $(C_2H_5)_2HSiOAlCl(C_2H_5)$, $(C_2H_5)_2HSiOAlBr(C_2H_5)$, $(C_2H_5)_2HSiOAlI(C_2H_5)$, $(C_2H_5)(n-C_3H_7)HSiOAlBr(n-C_3H_7)$, $(CH_3)(n-C_4H_9)HSiOAlBr(i-C_3H_7)$, $(n-C_4H_9)_2HSiOAlCl(n-C_4H_9)$, $(n-C_4H_9)_2HSiOAlI(n-C_4H_9)$, $(CH_3)(C_2H_5)HSiOAlCl(C_3H_5)$, $(CH_3)(i-C_3H_7)HSiOAlCl(C_2H_5)$, $(CH_3)(n-C_4H_9)HSiOAlCl(n-C_4H_9)$, $(CH_3)(n-C_5H_{11})HSiOAlCl(C_2H_5)$, $(CH_3)(C_6H_5)HSiOAlCl (C_6H_5)$, $(CH_3)(1-C_{10}H_7)HSi$-

OAlCl(p–CH$_3$C$_6$H$_4$), (CH$_3$)(cyclo C$_6$H$_{11}$)HSiOAlCl-(cyclo C$_6$H$_{11}$), (n–C$_3$H$_7$)$_2$HSiOAlCl (cyclo C$_5$H$_9$), (C$_2$H$_5$)$_2$HSiOAlCl(cyclo C$_4$H$_7$) and (CH$_3$)(i–C$_4$H$_9$)HSi-OAlCl(i–C$_4$H$_9$).

3. A process according to claim 1, wherein the compound of the formula,
TiX$_p$, VX$_p$, TiX$_{4-q}$(OR$^5$), VOX$_{3-r}$(OR$^5$)$_r$ and VOX$_3$
is selected from the group consisting of TiCl$_4$, TiCl$_3$, TiCl$_2$, VCl$_4$, VCl$_3$, VCl$_2$, TiBr$_4$, TiBr$_3$, TiBr$_2$, VBr$_4$, VBr$_3$, VBr$_2$, TiI$_4$, TiI$_3$, TiI$_2$, VI$_4$, VI$_3$, VI$_2$, TiCl$_3$(OCH$_3$), TiCl$_3$(OC$_2$H$_5$), TiCl$_3$(O n–C$_4$H$_9$), TiCl$_3$(O n–C$_6$H$_{13}$), TiCl$_3$(O cyclo C$_6$H$_{11}$), TiCl$_3$(O C$_6$H$_5$), TiCl$_3$(O p–CH$_3$C$_6$H$_4$), TiBr$_3$(O TiI$_3$(O C$_2$H$_5$), TiI$_3$(O n–C$_3$H$_7$), TiI$_3$(O i–C$_3$H$_7$), TiI$_3$(O n–C$_4$H$_9$), TiCl$_2$(O CH$_3$)$_2$, TiCl$_2$(O C$_2$H$_5$)$_2$, TiCl$_2$(O n–C$_3$H$_7$)$_2$, TiCl$_2$(O i–C$_3$H$_7$)$_2$, TiCl$_2$(O n–C$_4$H$_9$)$_2$, TiCl$_2$(O i–C$_4$H$_9$)$_2$, TiCl$_2$(O cyclo C$_6$H$_{11}$)$_2$, TiCl$_2$(O p–CH$_3$C$_6$H$_4$)$_2$, TiI$_2$(O CH$_3$)$_2$, TiI$_2$(O C$_2$H$_5$)$_2$, TiI$_2$(O i–C$_4$H$_9$)$_2$, TiCl(O CH$_3$)$_3$, TiCl(O C$_2$H$_5$)$_3$, TiCl(O n–C$_3$H$_7$)$_3$, TiCl(O i–C$_3$H$_7$)$_3$, TiCl(O n–C$_4$H$_9$)$_3$, TiCl(O i–C$_4$H$_9$)$_3$, TiCl(O n–C$_5$H$_{11}$)$_3$, TiCl(O C$_6$H$_5$)$_3$, TiI(O i–C$_4$H$_9$)$_3$, TiI(O n–C$_3$H$_7$)$_3$, TiI(O i–C$_3$H$_7$)$_3$, VOCl$_2$(O CH$_3$), VOCl$_2$(O C$_2$H$_5$), VOCl$_2$(O n–C$_3$H$_7$), VOCl$_2$(O i–C$_3$H$_7$), VOBr$_2$(O n–C$_3$H$_7$), VOBr$_2$(O i–C$_3$H$_7$), VOBr$_2$(O n–C$_4$H$_9$), VOBr$_2$(O i–C$_4$H$_9$), VOI$_2$(O CH$_3$), VOI$_2$(O C$_2$H$_5$), VOI$_2$(O n–C$_5$H$_{11}$), VOI$_2$(O cyclo C$_6$H$_{11}$), VOI$_2$(O n–C$_5$H$_{11}$), VOCl(O CH$_3$)$_2$, VOCl (O C$_2$H$_5$)$_2$, VOCl(O n–C$_3$H$_7$)$_2$, VOCl(O i–C$_3$H$_7$)$_2$, VOBr(O CH$_3$)$_2$, VOBr(O C$_2$H$_5$)$_2$, VOBr(O i–C$_4$H$_9$)$_2$, VOI(O CH$_3$)$_2$, VOI(O C$_2$H$_5$)$_2$, VOCl$_3$, VOBr$_3$ and VOI$_3$.

4. A process according to claim 1, wherein the solid compound obtained by the reaction between one member selected from the group consisting of TiX$_4$, VX$_4$, TiX$_{4-q}$(OR$^5$)$_q$, VOX$_{3-r}$(OR$^5$)$_r$ and VOX$_3$ and one member selected from the group consisting of AlR$_v$.$^6$(OR$^7$)$_w$X$_{-3-v}$, SiR$^8_3$H, (R$^9$HSiO)$_s$, R$^{10}$R$^{11}$R$^{12}$SiO–(R$^{13}$HSiO)$_t$–Sir$^{12}$R$^{11}$R$^{10}$ and a combination of one member selected from SiR$^8_3$H, (R$^9$HS:O)$_s$ and R$^{10}$R$^{11}$R$^{12}$SiO–(R$^{13}$HSiO)$_t$–R$^{12}$R$^{11}$R$^{10}$ and one member selected from AlCl$_3$, AlBr$_3$ and FeCl$_3$ is selected from the group consisting of the solid compounds obtained by the reaction between one member selected from the group consisting of TiCl$_4$, TiCl$_2$(O n–C$_4$H$_9$)$_2$, VCl$_4$ and VOCl$_3$ and one member selected from the group consisting of Al(C$_2$H$_5$)$_3$, Al(C$_2$H$_5$)$_2$, AlCl$_2$(C$_2$H$_5$), Al(O C$_2$H$_5$)(C$_2$H$_5$)$_2$, Al(i–C$_4$H$_9$)$_3$, AlCl(i-–C$_4$H$_9$)$_2$, (CH$_3$)$_3$SiH, (C$_2$H$_5$) SiH, [(CH$_3$)HSiO]$_4$, (CH$_3$)$_3$SiO– [(CH$_3$)HSiO]$_{30}$–Si(CH$_3$)$_3$ and a combination of one member selected from the group consisting (CH$_3$)$_3$SiH, (C$_2$H$_5$)$_3$SiH, [(CH$_3$)HSiO]$_4$ and (CH$_3$)$_3$SiO– [(CH$_3$)HSiO]$_{30}$–Si(CH$_3$)$_3$ and one member selected from the group consisting of AlCl$_3$, AlBr$_3$ and FeCl$_3$.

5. A process according to claim 1, wherein the polymerization is conducted in the presence of at most 50 mole percent, based upon the ethylene reactant, of hydrogen.

6. A process for producing an ethylene copolymer containing at most 10 weight percent of one alpha-olefin having three to 10 carbon atoms which comprises copolymerizing ethylene and said alpha-olefin in the presence of a catalyst prepared by the reaction between (A) at least one compound of the general formula;

$$R^1R^2HSiOAlX^1X^2$$

wherein R$^1$ and R$^2$ represent independently members selected from the group consisting of alkyl groups having one to five carbon atoms, cyclohexyl, phenyl and 1-naphthyl; X$^1$ and X$^2$ represent members selected from the group consisting of alkyls having 1 to 5 carbon atoms, cycloalkyls having four to six carbon atoms, phenyl; p-tolyl and halogens selected from the group consisting of Cl, Br and I and at least one of X$^1$ and X$^2$ represents said halogen, and (B) at least one compound selected from the group consisting of
1. TiX$^3_p$, VX$^3_p$, TiX$^3_{4-q}$(OR$^3$)$_q$, VOX$^3_{3-r}$(OR$^3$)$_r$ and VOX$^3_3$ wherein X$^3$ represents halogen selected from the group consisting of Cl, Br, and I; R$^3$ represents one member selected from the group consisting of alkyls having one to six carbon atoms, cyclohexyl, phenyl and p-tolyl; p is an integer of 2 to 4, q is an integer of 1 to 3; r is an integer of 1 to 2; and
2. the solid compounds obtained by the reaction between one member selected from the group consisting of TiX$^3_4$, VX$^3_4$, TiX$^3_{4-q}$(OR$^3$)$_q$, VOX$^3_{3-r}$(OR$^3$)$_r$ and VOX$^3_3$ and one member selected from the group consisting of AlR$^4_v$(OR$^5$)$_w$X-$^3_{3-v}$, SiR$^6_3$H, (R$^7$HSiO)$_s$, R$^8$R$^9$R$^{10}$SiO–(R$^{11}$HSiO)$_t$–SiR$^{10}$R$^9$R$^8$ and combination of one member selected from SiR$^6_3$H, (R$^7$HSiO)$_s$ and R$^8$R$^9$R$^{10}$SiO–(R$^{11}$HSiO)$_t$–SiR$^{10}$R$^9$R$^8$ and one member selected from AlCl$_3$, AlBr$_3$ and FeCl$_3$ wherein R$^3$ and X$^3$ represent independently the same groups as defined above; R$^4$ and R$^5$ represents independently the same groups above-defined R$^3$; R$^6$, R$^7$, R$^8$, R$^9$, R$^{10}$ and R$^{11}$ represent independently the same groups as above-defined R$^1$ or R$^2$; q and r represent independently the same integers as above-defined; v is an integer of 1 to 3, w is 0 or an integer of 1 to 2, y is an integer of 1 to 3 and v + w + y = 3; s is an integer of 3 to 6; t is at least one and the viscosity of R$^8$R$^9$R$^{10}$SiO–(R$^{11}$HSiO)$_t$–SiR$^{10}$R$^9$R$^8$ is at most 2,000 centistrokes, the mole ratio of the compound (A) to the compound (B) being 0.5 – 5:1.

7. A process according to claim 6, wherein said alpha-olefin is one member selected from the group consisting of propylene, butene-1, 3-methyl-butene-1, pentene-1, 4-methylpentene-1, hexene-1, heptene-1, octene-1, nonene-1 and decene-1.

* * * * *

UNITED STATES PATENT OFFICE
CERTIFICATE OF CORRECTION

Patent No. 3,787,323   Dated January 22, 1974

Inventor(s) ITSUHO AISHIMA ET AL   (page 1 of 2)

It is certified that error appears in the above-identified patent and that said Letters Patent are hereby corrected as shown below:

Col. 2, line 53, change "$(i-C_4H_9)_2HSiOAlBr_2$" to

-- $(i-C_4H_9)_2\underline{H}SiOAlBr_2$ --.

Col. 2, line 55, change "cycle" to -- cyclo --.

Col. 4, lines 31-39, correct formula to read as follows:

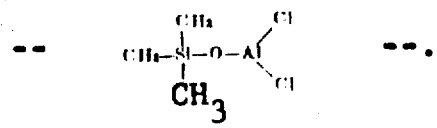

Col. 8, Table II, in the heading, cancel "Yield" below "Example"

and insert -- Yield -- below "Polymer".

Col. 8, Table II, line 68, cancel "No." above "10".

Col. 10, line 2, claim 2, after "groups" insert -- as defined --.

Col. 10, line 61, claim 2, change "$(C_2H_5)_2HSiOAli(C_2H_5)$" to

-- $(C_2H_5)_2HSiOAl\underline{I}(C_2H_5)$ --.

Col. 10, line 66, claim 2, change "$(C_3$" to -- $(C_2$ --.

Col. 11, between lines 13 and 14, claim 3, insert

-- $CH_3$), $TiBr_3(OC_2H_5)$, $TiBr_3(O\ n-C_2H_9)$, $TiI_3(OCH_3)$, --.

UNITED STATES PATENT OFFICE
CERTIFICATE OF CORRECTION

Patent No. 3,787,323                Dated _____

(page 2 of 2)

Inventor(s) _____

It is certified that error appears in the above-identified patent and that said Letters Patent are hereby corrected as shown below:

Col. 11, line 26, claim 3, change "$\underline{VOI2}$" -- $VOI_2$ --.

Col. 11, line 39, claim 4, change "$(R^9HS{:}O)_s$" to -- $(R^9HSiO)_s$ --.

Signed and sealed this 7th day of January 1975.

(SEAL)
Attest:

McCOY M. GIBSON JR.                 C. MARSHALL DANN
Attesting Officer                    Commissioner of Patents